United States Patent
Pawar et al.

(10) Patent No.: US 10,361,974 B1
(45) Date of Patent: Jul. 23, 2019

(54) CONTROLLING BASE STATION BUFFERING OF DATA FOR A WIRELESS COMMUNICATION DEVICE BASED ON THE EXTENT TO WHICH THE WIRELESS COMMUNICATION DEVICE PROVIDES CONNECTIVITY FOR OTHER DEVICES

(71) Applicant: Sprint Spectrum L.P., Overland Park, KS (US)

(72) Inventors: Hemanth B. Pawar, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 118 days.

(21) Appl. No.: 15/400,636

(22) Filed: Jan. 6, 2017

(51) Int. Cl.
```
H04W 28/02     (2009.01)
H04W 72/08     (2009.01)
H04W 76/10     (2018.01)
H04W 88/02     (2009.01)
H04W 88/08     (2009.01)
H04L 12/861    (2013.01)
```

(52) U.S. Cl.
CPC ..... *H04L 49/9005* (2013.01); *H04W 28/0278* (2013.01); *H04W 72/085* (2013.01); *H04W 76/10* (2018.02); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2007/0025356 A1* | 2/2007 | Kataria | .................... | H04L 47/30 370/395.3 |
| 2010/0046400 A1* | 2/2010 | Wu | ........................ | H04L 12/189 370/256 |
| 2010/0261479 A1* | 10/2010 | Hidaka | .................... | H04L 45/12 455/445 |
| 2010/0302946 A1* | 12/2010 | Yang | ...................... | H04B 7/155 370/235 |
| 2012/0044814 A1* | 2/2012 | Natarajan | .............. | H04B 7/155 370/246 |

(Continued)

FOREIGN PATENT DOCUMENTS

WO    2016059063 A1    4/2016

*Primary Examiner* — Alpus Hsu
*Assistant Examiner* — Camquyen Thai (57) ABSTRACT

Disclosed herein is a method and system for controlling base station buffering of data. In an example method, the base station serves a wireless communication device (WCD) over an air interface, where the air interface encompasses a quantity of channels on which the base station serves the WCD, where the base station is configured to buffer, in a data buffer, data awaiting transmission to the WCD, where the buffer has a fullness-threshold defining a maximum quantity of data that the base station will buffer for the WCD, and where the base station is configured to respond to the quantity of data in the buffer meeting the fullness-threshold by increasing the quantity of channels. Then, while serving the WCD, the base station determines an extent to which the WCD provides connectivity between at least one other device and the base station, and sets and applies the fullness-threshold based on the extent.

11 Claims, 3 Drawing Sheets

(56) References Cited

U.S. PATENT DOCUMENTS

2012/0230224 A1* 9/2012 Aminaka ............... H04L 5/001
 370/255
2015/0222560 A1* 8/2015 Kakadia ................ H04L 47/50
 370/235

* cited by examiner

CONTROLLING BASE STATION BUFFERING OF DATA FOR A WIRELESS COMMUNICATION DEVICE BASED ON THE EXTENT TO WHICH THE WIRELESS COMMUNICATION DEVICE PROVIDES CONNECTIVITY FOR OTHER DEVICES

BACKGROUND

In a wireless communication system, a base station provides one or more coverage areas, such as cells or sectors, in which the base station may serve wireless communication devices (WCDs), such as cell phones, wirelessly-equipped personal computers or tablets, tracking devices, embedded wireless communication modules, or other devices equipped with wireless communication functionality. Further, the base station may be in communication with network infrastructure including a gateway system that provides connectivity with a transport network such as the Internet for instance. With this arrangement, a WCD within coverage of the base station may engage in air interface communication with the base station and may thereby communicate via the base station and gateway system with various other entities.

In general, a base station may provide service in accordance with a particular air interface protocol or radio access technology, examples of which include Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), IEEE 802.11 (WiFi), and others now known or later developed.

In accordance with the air interface protocol, each base station may assign a certain extent of air interface channels for use in providing wireless service to WCDs. By way of example, each base station may provide wireless service to WCDs on one or more radio frequency carriers, where each carrier defines one or more ranges of frequency spectrum and has a respective downlink channel for carrying communications from the base station to WCDs and a respective uplink channel for carrying communications from the WCDs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink and uplink channels may then define various sub-channels for carrying particular communications, such a control signaling and data (e.g., application layer data) between the base station and served WCDs. A given base station could be arranged to serve a WCD on a single such carrier at a time or, with "carrier aggregation service" or the like, on multiple carriers at a time.

Each carrier may also define various logical channels to facilitate communication between the base station and one or more served WCDs. For instance, on the downlink, a carrier may define a reference channel on which the base station broadcasts a reference signal useable by WCDs to detect and evaluate coverage, various other downlink control channels to carry control signaling (such as resource-scheduling directives) to WCDs, and one or more shared or traffic channels for carrying bearer data (e.g., user or application level data) to WCDs. And on the uplink, a carrier may define one or more uplink control channels to carry control signaling (such as resource scheduling requests) from WCDs, and one or more shared or traffic channels for carrying bearer data from WCDs. In practice, the shared or traffic channels may define particular physical resources for carrying data between the base station and WCDs.

When a WCD initially enters into coverage of such a system (e.g., powers on or moves into coverage of the system), the WCD may scan for a strongest coverage area in which to operate, and the WCD may then engage in signaling with the base station that provides that coverage area, to establish a radio-link-layer connection with the base station and to register the WCD to be served by the base station and generally by the network. Thereafter, the base station may serve the WCD with data communications on one or more carriers. For instance, when data such as user-plane (e.g., bearer) data and control-plane (e.g., control signaling) data arrives over the transport network for transmission to the WCD, the gateway system may transmit the data to the base station, and the base station may then transmit the data over the radio-link-layer connection to the WCD.

OVERVIEW

In practice, each air interface channel will have a limited and varying capacity available for use in transmitting data to served WCDs. By way of example, each carrier on which the base station provides service will have a limited frequency bandwidth, and a finite quantity of air interface resources could be defined within that bandwidth for carrying data communications from the base station to served WCDs. Other limitations may be possible as well.

Typically, when the base station receives data destined to a served WCD, the base station will schedule and then accordingly transmit the data to the WCD over the air interface on the available capacity. However, the base station sometimes may be serving so many WCDs or so much air interface communication that the base station may not have sufficient air interface capacity available on which to transmit data to the WCD. In this scenario, the base station may be configured to respond to the lack of sufficient available capacity by buffering data that is awaiting transmission to the WCD while the base station waits for additional capacity to become available. For this purpose, the base station may establish and maintain in physical data storage a data buffer for the WCD.

To help manage data buffering in practice, the base station may also be configured to apply a buffer fullness-threshold defining a maximum amount of data that the base station will buffer for the WCD, and the base station may be configured to take certain actions when the amount of data in the buffer meets that fullness-threshold. In particular, the base station may be configured to detect when the amount of data in the data buffer meets the fullness-threshold and to responsively then allocate additional air interface capacity, such as one or more additional carriers, to the WCD.

There are various scenarios in which a base station configured to manage data buffering in this way will accumulate a large extent of buffered data. In particular, the base station may accumulate such an extent in scenarios where the base station buffers data for a type of WCD that is configured to provide at least one other device, such as conventional, endpoint (e.g., end-user) WCDs, with connectivity to the base station.

For example, the WCD served by the base station may be a module that provides wireless backhaul connectivity for a relay base station (e.g., small cell base station) that in turn serves at least one endpoint WCD. In this scenario, the base station will receive and buffer, in the data buffer for the WCD, user-plane and control-plane data destined to the endpoint WCD(s) served by the relay base station. In particular, the control-plane traffic could be signaling traffic that the relay base station communicates with other entities of the core network, and the user-plane traffic could be traffic communicated between the endpoint WCD(s) and the core network (e.g., on the transport network, via the core network).

As another example, the WCD may be functioning as a hotspot through which the base station provides at least one endpoint WCD with service. In this scenario, the base station will receive and buffer, in the data buffer for the WCD, data destined to the WCD, as well as data destined to the endpoint WCD(s) for which the WCD provides connectivity.

In scenarios such as these, it may be desirable to more quickly trigger an allocation of additional air interface capacity to the WCD. With additional capacity more readily available for use in transmitting data to the other device(s) for which the WCD is providing connectivity, the base station can in turn more readily transmit such data using the additional capacity, thereby reducing the amount of data accumulated in the data buffer for the WCD.

The present disclosure thus provides for controlling a base station's buffering of data based on a consideration of the extent to which a served WCD provides connectivity between at least one other device and the base station. As such, the disclosure draws a distinction between a WCD operating as an endpoint device that is not configured to provide at least one other device with connectivity to the WCD's serving base station, and a WCD operating as a "hotspot WCD," "relay-WCD" or the like, that is configured to provide at least one other device with connectivity to the WCD's base station.

In accordance with the disclosure, the base station may be arranged to determine the extent to which its served WCD provides connectivity between at least one other device and the base station, and then to set the WCD's buffer fullness-threshold based on that extent. For instance, the base station could set the buffer fullness-threshold lower for WCDs that provide such connectivity than for WCDs that do not provide such connectivity; and for WCDs that provide such connectivity, the base station could set the buffer-fullness threshold lower as the WCDs provide a greater extent of such connectivity, such as when such a WCD is providing connectivity for a greater number of other devices.

Thus, in one respect, disclosed is a method for controlling base station buffering of data in a wireless communication system. The method involves the base station serving a WCD over an air interface between the base station and the WCD, where the air interface encompasses a quantity of channels on which the base station serves the WCD, where the base station is configured to buffer, in a data buffer, data awaiting transmission over the air interface to the WCD, where the data buffer has a fullness-threshold defining a maximum quantity of data that the base station will buffer for the WCD, and where the base station is configured to respond to the quantity of data in the data buffer meeting the fullness-threshold by increasing the quantity of channels on which the base station serves the WCD. Further, the method involves, while serving the WCD over the air interface, the base station (i) determining an extent to which the WCD provides connectivity between at least one other device and the base station, and (ii) setting the fullness-threshold based on the determined extent.

In another respect, disclosed is a base station configured as described above. The base station comprises a wireless communication interface for serving a WCD over an air interface, where the air interface encompasses a quantity of channels on which the base station serves the WCD, as described above. Further, the base station comprises data storage, a processing unit, and program instructions stored in the data storage and executable by the processing unit to carry out operations in accordance with the method described above.

And in another respect, disclosed is a method for controlling base station buffering of data in a wireless communication system, where the wireless communication system comprises a base station. The method involves the base station serving a WCD over a radio-link-layer connection between the base station and the WCD, where the radio-link-layer connection encompasses a quantity of carriers on which the base station serves the WCD, where the base station is configured to buffer, in a data buffer, data awaiting transmission over the radio-link-layer connection to the WCD, where the base station is configured to apply for the WCD a buffer fullness-threshold defining a maximum quantity of data that the base station will buffer for the WCD, and where the base station is configured to respond to the quantity of data in the data buffer meeting the buffer fullness-threshold by increasing the quantity of carriers on which the base station serves the WCD. Further, the method involves, while serving the WCD over the radio-link-layer connection, the base station (i) making a determination that the WCD is configured to provide connectivity between at least one other device and the base station, and (ii) based at least in part on the determination that the WCD is configured to provide connectivity between at least one other device and the base station, decreasing the buffer fullness-threshold.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Still further, in line with the discussion above, this disclosure will primarily discuss carriers as a representative example of a type of air interface capacity that a base station allocates for use in serving WCDs. However, it will be understood that other types of air interface capacity are possible as well, such as air interface channels (e.g., Walsh-coded channels in CDMA).

Figure 1:
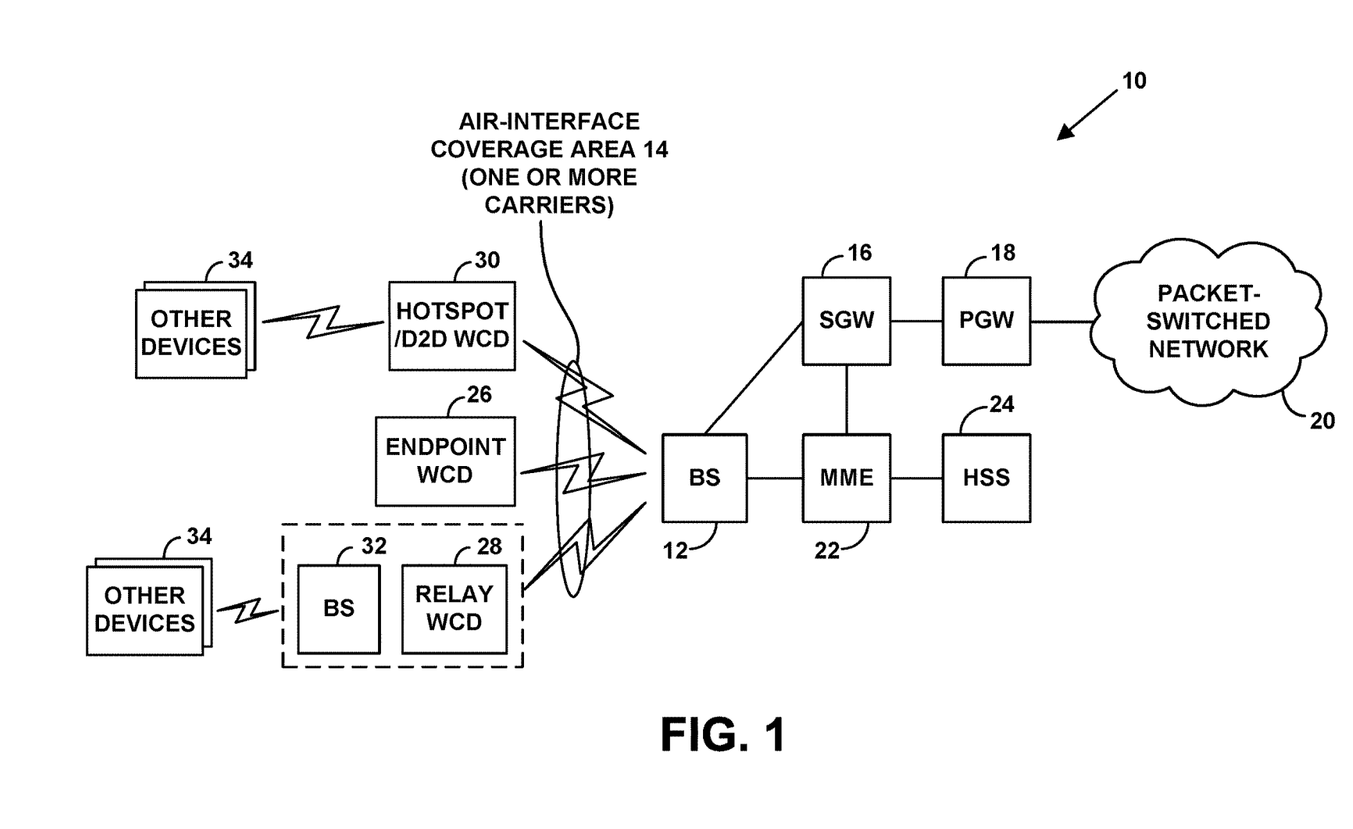
FIG. 1 is a simplified block diagram of an example wireless communication system in which aspects of the present disclosure can be implemented.

Referring to the drawings, as noted above, FIG. 1 is a simplified block diagram of a wireless communication system in which aspects of the present disclosure can be implemented. In particular, FIG. 1 depicts a representative LTE network 10, which functions primarily to serve WCDs with wireless packet data communication service, including possibly voice-over-packet service, but may also provide other functions. As shown, the LTE network includes a base station (eNodeB) 12, which includes an antenna structure and associated equipment for providing an LTE air interface coverage area 14 in which to serve WCDs (e.g., cell phones, tracking devices, embedded wireless modules, or other wirelessly-equipped devices). The base station 12 has a communication interface with a serving gateway (SGW) 16, and the SGW has a communication interface with a packet-data network gateway (PGW) 18 that provides connectivity with a packet-switched network 20 such as the Internet. Further, the base station 12 has a communication interface with a mobility management entity (MME) 22, which has communication interfaces with the SGW and with a home subscriber server (HSS) 24, and which functions as a signaling controller in the network. In practice, the illustrated components of the LTE network may sit as nodes on a private packet-switched network owned by an operator of the LTE network, and thus the various communication interfaces may be logical interfaces through that network.

As illustrated, base station 12 is configured (e.g., licensed and equipped) to provide service on various LTE carriers, each of which could be FDD or TDD, and each of which has a particular downlink frequency bandwidth. For instance, each of the carriers could have a downlink bandwidth such as 1.4 MHz, 3 MHz, 5 MHz, 15 MHz, or 20 MHz. In practice, each of these carriers (and/or, if FDD, its particular downlink and uplink frequency channels) may be identified by a globally unique identifier per industry standard, so that the base station and a served WCD can refer to particular carriers by those identifiers.

In addition, FIG. 1 illustrates three example WCDs 26, 28, 30 being served by the base station 12 over air interface 14. WCD 26 is typical endpoint WCD such as a cell phone or wirelessly-equipped computer, tablet, or other device that does not provide connectivity for at least one other device.

WCDs 28 and 30, on the other hand, are WCDs that are each configured to provide connectivity for at least one other device. In particular, WCD 28 is configured as a relay-WCD coupled or integrated with a small cell base station (relay base station) 32 or the like that is in turn configured (similar to base station 12) to serve at least one other device 34 (e.g., at least one endpoint WCD). As such, WCD 28 functions as an intermediary between base station 12 and any devices served by small cell base station 32, with the air interface connection between WCD 28 and base station 12 functioning as a wireless backhaul link for the small cell base station 32.

Further, WCD 30 is configured as a hotspot WCD (also known as a device-to-device (D2D) WCD) such as a cell phone having a personal-hotspot feature, to function as an intermediary between base station 12 and at least one other device 34, similar to the relay-WCD. For example, a hotspot WCD can be configured to turn on its personal-hotspot feature by way of a software switch so that the WCD then begins to operate in a hotspot mode in which it is set to (i) connect via WiFi or another connection with one or more endpoint WCDs, (ii) engage in communication with a base station (e.g., base station 12) via a cellular air interface, and (iii) bridge those communications.

In practice, when any such WCD (endpoint, relay, or hotspot) enters into coverage of an LTE base station such as base station 12, the WCD may detect the base station's coverage on a particular carrier and may engage in a process to attach with or hand over to the base station and be served on the detected carrier. In this process, the WCD may engage in signaling with the base station to establish a radio-link-layer connection (e.g., radio resource control (RRC) connection) over the air interface on the detected carrier so that the base station may then serve the WCD on that carrier. As such, the radio-link-layer connection could be considered to effectively encompass initially just that one carrier. If appropriate, however, the base station may arrange through RRC signaling to initially serve the WCD on multiple carriers at once, providing the WCD with carrier aggregation service.

Further, in this process, the WCD may transmit an attach request over the radio-link-layer connection to the base station, which the base station may forward to the MME, and the MME may then engage in signaling to control setup of one or more bearers for carrying data for the WCD between the PGW and the base station. Further, in this attach process, the WCD may convey to the base station information about the WCD's profile and configuration, and the MME may also receive such WCD information from the HSS 24 and convey that information to the base station, and the base station may store this information in a local context record for the WCD.

Additionally, in practice, each such WCD may store profile, configuration, or status information, such as data that specifies the extent to which the WCD provides connectivity for at least one other device. For instance, the WCD could store data that indicates whether the WCD is the type of device that provides such connectivity. By way of example, the WCD could store an indication of whether the WCD is configured to operate as a relay-WCD for a small cell base station, or is configured to operate as a hotspot WCD as discussed above. Or rather, as another example, the WCD could store an indication that the WCD is just an endpoint device. Further, if the WCD is the type of device that provides such connectivity, the WCD could store data that indicates how many other devices the WCD is currently providing with such connectivity.

This WCD data could be established and stored in each WCD in various ways and at various times. For instance, at the time of manufacture, distribution, or deployment, a WCD could be provisioned with data that specifies whether the WCD is the type of device that will provide connectivity for at least one other device, such as whether the WCD will function as a relay-WCD or hotspot WCD or will rather function as an endpoint WCD. Further, while in use, the WCD could be provisioned or re-provisioned with such data if the profile, configuration, or status of the WCD changes, such as if an endpoint WCD gets connected and set to function as a relay-WCD or gets provisioned with hotspot functionality.

By way of example, an endpoint WCD could be provisioned with data indicating that the WCD does not provide connectivity for at least one other device (or, just as well, could lack data that indicates the WCD provides connectivity for at least one other device). Further, a relay-WCD or hotspot WCD could be provisioned with data indicating that the WCD is configured to provide such connectivity, such as a general indication that the WCD provides such connectivity, or a specific indication that the WCD is currently providing such connectivity. For instance, when a relay-WCD is configured to provide such connectivity, the relay-WCD may set a context record parameter or flag once the WCD has established local area network (LAN) communication or the like with a small cell base station and/or once the WCD acquires a bearer specifically for serving a small cell base station. And a hotspot WCD may store, as a context record parameter or flag, an indication of whether the hotspot WCD includes a personal-hotspot feature for providing hotspot service, or an indication of whether the personal-hotspot feature is currently turned on or off.

Still further, a WCD that provides connectivity for at least one other device could be provisioned with data that indicates the quantity of such devices for which the WCD is currently providing connectivity. For instance, a relay-WCD could receive from its associated small cell base station an indication of the quantity of devices that are currently connected with or otherwise served by the small cell base station, including updates as the quantity changes, and could store that quantity as the quantity of devices for which the relay-WCD is currently providing connectivity. And a hotspot WCD could likewise determine and store an indication of how many other devices the hotspot WCD is currently providing with connectivity. Variations and other examples are possible as well.

During registration of the WCD or perhaps at some point after, the base station 12, MME 22, or other entity may receive and store this WCD data. The base station 12 may receive this WCD data in various ways. For example, the WCD may convey its data to the base station, perhaps when the WCD initially attaches with the base station, and the base station could store the data in a context record for the WCD as a context record parameter, profile parameter, or the like that is keyed to a WCD identifier such as an International Mobile Subscriber Identity (IMSI) or a public land mobile network (PLMN) ID. Alternatively, the base station may receive such WCD data from the HSS 24, via the MME 22, and then store the information in the context record for the WCD.

Further, as the WCD's information changes, such as if the WCD transitions between being an endpoint WCD to being a WCD that provides connectivity for at least one other device, or when the quantity of devices for which the WCD provides connectivity changes, the WCD may transmit to the base station a message including updated WCD data indicating the change, or may convey the change to the base station in some other manner, and the base station store the data indicating the change in the context record for the WCD. Alternatively, the base station may receive the updated WCD data from the HSS, via the MME, and store the updated WCD data in the context record for the WCD.

With the arrangement shown in FIG. 1, base station 12 may serve each such WCD with data communications, transmitting such data to each such WCD on the one or more carriers encompassed by the WCD's radio-link-layer connection. As noted above, however, base station 12 may not always have sufficient air interface capacity available on which to transmit data to the WCD. As such, the base station may maintain in physical data storage a data buffer for the WCD, and may buffer, in this data buffer, data awaiting transmission to the WCD while the base station waits for additional capacity to become available. Further, in line with the discussion above, base station 12 may be configured to apply for the WCD a buffer fullness-threshold defining a maximum amount of data that the base station will buffer for the WCD, and may be configured to respond to the amount of data in the data buffer meeting the fullness-threshold by allocating one or more additional carriers to the WCD.

The act of allocating additional carriers to the WCD may occur in various ways, and may depend on how many carriers are encompassed by the WCD's radio-link-layer connection at the time the fullness-threshold is met. For instance, if the radio-link-layer connection encompasses just one carrier at the time the fullness-threshold is met, the act of allocating additional carriers to the WCD may involve allocating at least one additional carrier to the WCD, so as to begin providing the WCD with carrier aggregation service. Whereas, if the base station is already providing the WCD with carrier aggregation service at the time the fullness-threshold is met, the act of allocating additional carriers to the WCD may involve allocating at least one additional carrier to the WCD, so as to expand the carrier aggregation service for the WCD.

To allocate one or more additional carriers to the WCD in practice, the base station may transmit to the WCD an RRC connection message (e.g., an initial RRC connection message, or an RRC connection reconfiguration message) that specifies the additional carrier(s) on which the base station will be serving the WCD, identifying each carrier by its global identifier for instance. The WCD may responsively then configure itself to engage in communication with the eNodeB on the additional carrier(s). Further, the base station may also update its context record for the WCD to indicate that the WCD's radio-link-layer connection now encompasses the identified carrier(s), so that the base station may then engage in data communication with the WCD on the carrier(s).

As noted above, the present disclosure draws a distinction between WCDs that provide connectivity between at least one other device and the base station, such as WCDs 28 or 30, and WCDs that do not provide such connectivity, such as WCD 26. This distinction is drawn because in practice the base station may accumulate a larger amount of buffered data for a WCD that provides such connectivity than for a WCD that does not provide such connectivity, or than for a WCD that provides a lesser extent of such connectivity. Further, in line with the discussion above, it may be desirable to more quickly trigger an allocation of additional air interface capacity, such as one or more additional carriers, to a WCD that provides such connectivity.

Accordingly, the present disclosure provides for controlling a base station's buffering of data for a served WCD based on a consideration of an extent to which the WCD provides connectivity between at least one other device and the base station. In particular, while the base station is serving a WCD, the base station will determine the extent to which the WCD provides such connectivity and will then use that determination as a basis for setting the fullness-threshold for the data buffer for that WCD. Thereafter, when the amount of data in the data buffer for the WCD meets the set fullness-threshold, the base station will respond by allocating additional air interface capacity to the WCD.

In the context of the disclosure, the base station may be considered to be "serving the WCD" at any point in time when the WCD and the base station have an established client-server relationship with each other and/or are in the process of establishing such a relationship. For example, the base station may perform this process during the attach process described above. Additionally or alternatively, the base station may perform this process at some point after the WCD has attached with the base station (e.g., when the WCD has an established radio-link-layer connection, but is operating in an idle mode).

To facilitate the disclosed process, the base station could be programmed with logic (e.g., program instructions) executable to determine the extent to which the WCD provides connectivity between at least one other device and the base station, and, based on that determination, to set the fullness-threshold for the data buffer for that WCD. For instance, to determine the extent to which the WCD provides such connectivity, the base station could refer to the context record data discussed above (provided by the WCD itself, or perhaps by the HSS) that specifies the extent.

In an example implementation of the disclosed process, the base station may determine the extent and then use the extent as a basis for establishing an initial fullness-threshold for the data buffer for the WCD. By way of example, if the base station determines that the WCD is not configured to provide connectivity between at least one other device and the base station, the base station may responsively establish a fullness-threshold that is higher than a fullness-threshold for a WCD that is configured to provide such connectivity.

As another example, if the base station determines that the WCD is currently providing such connectivity, the base station may responsively then establish a fullness-threshold that is lower than a fullness-threshold for a WCD that does not provide such connectivity, or than a fullness-threshold for a WCD that is configured to provide such connectivity but is not currently providing such connectivity.

As yet another example, if the base station determines that the WCD is currently providing such connectivity for more than a predefined threshold quantity of other devices (e.g., for more than one other device), the base station may responsively then establish a fullness-threshold that is lower than a fullness-threshold for a WCD that does not provide such connectivity, or than a fullness-threshold for a WCD that provides a lesser extent of such connectivity (e.g., a WCD that is currently providing such connectivity for one other device or for no other devices).

Furthermore, there may be a scenario in which the base station is configured to apply for the WCD a default, initial fullness-threshold for the data buffer before the base station considers the extent to which the WCD provides such connectivity. As such, in another example implementation of the disclosed process, the base station may determine the extent and then use the extent as a basis for either (i) adjusting (e.g., decreasing) the initial fullness-threshold, whereby the base station then applies the adjusted fullness-threshold, or (ii) continuing to apply the initial fullness-threshold.

By way of example, if the base station determines that the WCD is configured to provide such connectivity, the base station may responsively then decrease the initial fullness-threshold, whereas if the base station determines that the WCD is not configured to provide such connectivity, the base station may responsively then continue to apply the initial fullness-threshold.

As another example, if the base station determines that the WCD is currently providing such connectivity, the base station may responsively then decrease the initial fullness-threshold, whereas if the base station determines that the WCD is not currently providing such connectivity, the base station may responsively then continue to apply the initial fullness-threshold.

As yet another example, if the base station determines that the WCD is currently providing such connectivity for more than a predefined threshold quantity of other devices (e.g., for more than one other device), the base station may responsively then decrease the initial fullness-threshold, whereas if the base station determines that the WCD is currently providing such connectivity for less than the predefined threshold quantity of other devices (e.g., for one other device or for no other devices), the base station may responsively then continue to apply the initial fullness-threshold.

Figure 2:
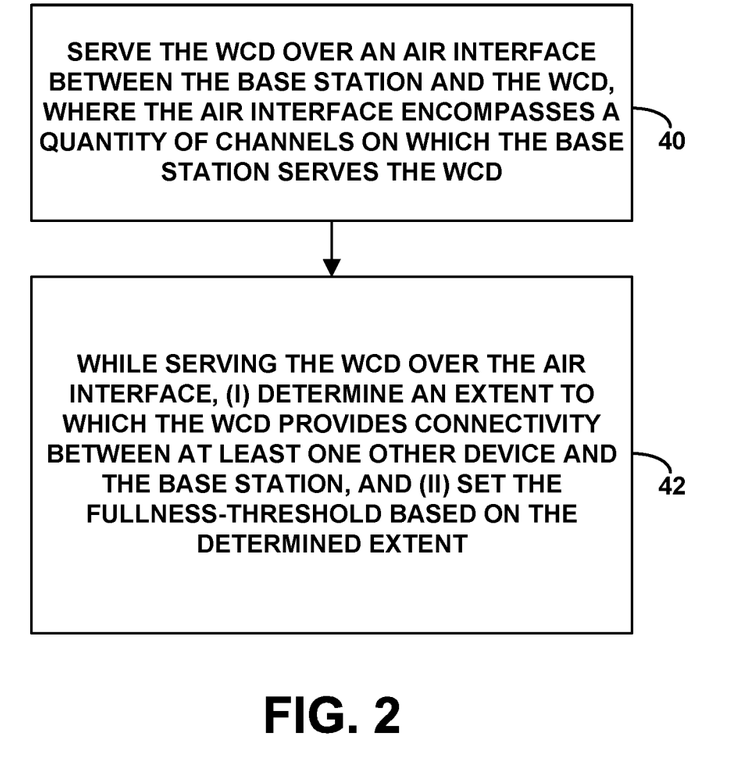
FIG. 2 is a flow chart depicting example operations that can be carried out in accordance with the present disclosure.

FIG. 2 is next a flow chart depicting operations of a representative method for controlling how a base station buffers data, where the base station is configured to buffer, in a data buffer, data awaiting transmission to a given WCD, where the data buffer has a fullness-threshold defining a maximum quantity of data that the base station will buffer for the WCD, and where the base station is configured to respond to the quantity of data in the data buffer meeting the fullness-threshold by increasing a quantity of channels on which the base station serves the WCD.

As shown in FIG. 2, at block 50, the method includes the base station serving a WCD over an air interface between the base station and the WCD, where the air interface encompasses a quantity of channels on which the base station serves the WCD. And the method further includes, at block 42, while serving the WCD over the air interface, the base station (i) determining an extent to which the WCD provides connectivity between at least one other device and the base station, and (ii) setting the fullness-threshold based on the determined extent.

In line with the discussion above, the base station may be configured to apply, for the WCD, an initial fullness-threshold for the data buffer before the base station determines the extent to which the WCD provides connectivity between at least one other device and the base station. As so configured, the act of setting the fullness-threshold may involve decreasing that initial fullness-threshold, whereby the base station may be configured to apply that decreased fullness-threshold.

Further in line with the discussion above, the act of determining the extent to which the WCD provides connectivity between at least one other device and the base station could involve determining whether the WCD is a type of device that is configured to provide connectivity between at least one other device and the base station (e.g., whether the WCD is configured to function as a relay-WCD or a hotspot WCD), and/or could involve determining whether the WCD is currently providing such connectivity. Additionally or alternatively, the act of determining the extent could involve determining a quantity of other devices for which the WCD is currently providing such connectivity, and the act of setting the fullness-threshold could accordingly involve setting the fullness-threshold based on the determined quantity.

Figure 3:
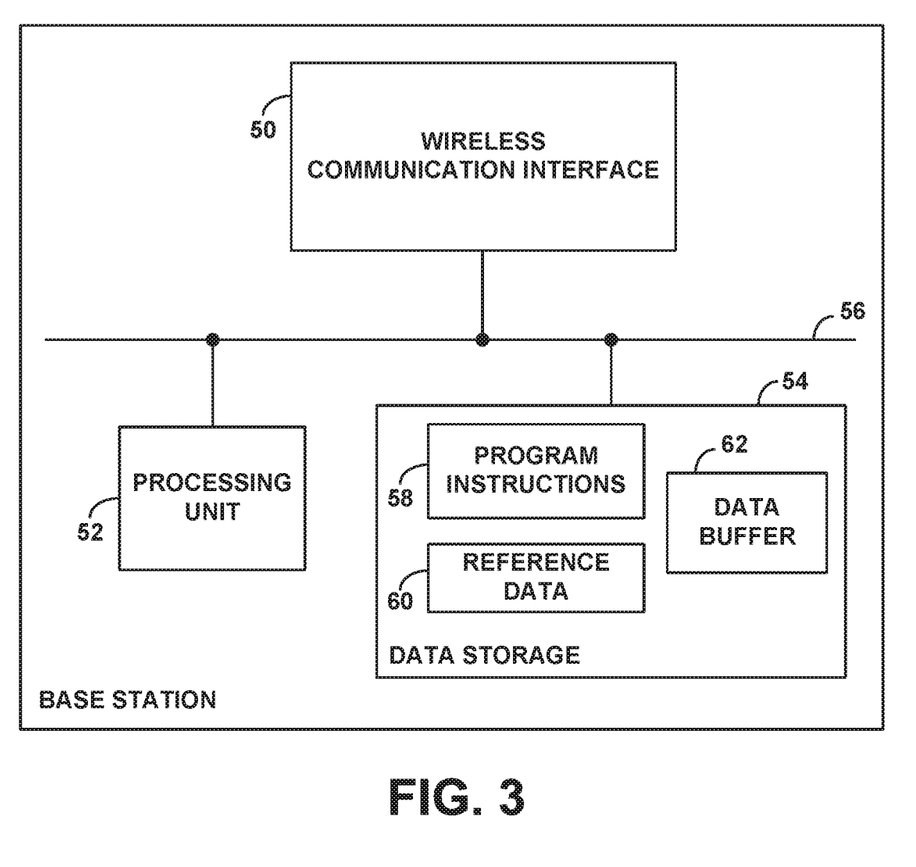
FIG. 3 is a simplified block diagram of an example base station operable in accordance with the present disclosure.

FIG. 3 is a simplified block diagram of an example base station, such as base station 12, showing some of the components that may be included in such a base station. As shown, the example base station includes a wireless communication interface 50, a processing unit 52, and data storage 54, all of which may be communicatively linked together by a system bus, network or other connection mechanism 56.

The wireless communication interface 50 may include an antenna structure and transceiver that are cooperatively configured to serve WCDs (e.g., WCD 26, 28, and 30), where a given WCD is served via an air interface connection encompassing at least one channel (e.g., carrier), in accordance with a particular air interface protocol (e.g., LTE).

The processing unit 52 could be configured to carry out various operations described herein, such as the operations discussed with respect to FIG. 2. The processing unit may take various forms, including various combinations of hardware, firmware, and software for instance. By way of example, the processing unit could comprise at least one processor, such as one or more general-purpose processors (e.g., microprocessors) and/or one or more special-purpose processors (e.g., application-specific integrated circuits). The processing unit could also comprise one or more non-transitory data storage elements (e.g., magnetic, optical, and/or flash storage), such as data storage 54. The data storage could then hold or be encoded with program instructions 58, reference data 60, and a data buffer 62. The program instructions could be executable by the processor(s) to carry out various operations described herein. The reference data 60 could include various WCD information to facilitate carrying out the operations, such as any of the information described above that indicates the extent to which the WCD provides connectivity between its serving base station and at least one other device. And the data buffer 62 may include respective data buffers for each WCD served by the base station.

Exemplary embodiments have been described above. Those skilled in the art will understand, however, that changes and modifications may be made to these embodiments without departing from the true scope and spirit of the invention.

What is claimed is:

1. A method for controlling base station buffering of data in a wireless communication system, wherein the wireless communication system comprises a base station, the method comprising:
   serving by the base station a wireless communication device (WCD) over an air interface between the base station and the WCD, wherein the air interface encompasses a quantity of channels on which the base station serves the WCD, wherein the base station is configured to buffer, in a data buffer, data awaiting transmission over the air interface to the WCD, wherein the data buffer has a first fullness-threshold defining a maximum quantity of data that the base station will buffer for the WCD, and wherein the base station is configured to respond to the quantity of data in the data buffer meeting the first fullness-threshold by increasing the quantity of channels on which the base station serves the WCD; and
   while serving the WCD over the air interface, the base station (i) determining a quantity of other devices the WCD is currently providing with connectivity to the base station, (ii) making a determination of whether the quantity of other devices is greater than a predefined threshold, wherein the predefined threshold is greater than zero, and (iii) responsive to the determination being that the quantity of other devices is greater than the predefined threshold, changing the first fullness-threshold to a second fullness-threshold that is lower than the first fullness-threshold, wherein the base station is then configured to respond to the quantity of data in the data buffer meeting the second fullness-threshold by increasing the quantity of channels on which the base station serves the WCD.

2. The method of claim 1, further comprising:
   the base station detecting that the quantity of data in the data buffer meets the set fullness-threshold; and
   responsive to detecting that the quantity of data in the data buffer meets the set fullness-threshold, the base station increasing the quantity of channels on which the base station serves the WCD.

3. The method of claim 1, wherein the air interface includes a radio-link-layer connection between the base station and the WCD, wherein the quantity of channels are a quantity of carriers encompassed by the radio-link-layer connection, wherein the radio-link-layer connection initially encompasses just one carrier, and wherein increasing the quantity of channels on which the base station serves the WCD comprises adding at least one carrier to the radio-link-layer connection to begin providing the WCD with carrier aggregation service.

4. The method of claim 1, further comprising:
   the base station receiving from the WCD data indicating the quantity of other devices the WCD is currently providing with connectivity to the base station; and
   the base station storing the data in a context record for the WCD,
   wherein determining the quantity of other devices the WCD is currently providing with connectivity to the base station comprises referring to the context record for the WCD to determine the quantity of other devices the WCD is currently providing with connectivity to the base station.

5. A method for controlling base station buffering of data in a wireless communication system, wherein the wireless communication system comprises a base station, the method comprising:
   serving by the base station a wireless communication device (WCD) over a radio-link-layer connection between the base station and the WCD, wherein the radio-link-layer connection encompasses a quantity of carriers on which the base station serves the WCD, wherein the base station is configured to buffer, in a data buffer, data awaiting transmission over the radio-link-layer connection to the WCD, wherein the base station is configured to apply for the WCD a first buffer fullness-threshold defining a maximum quantity of data that the base station will buffer for the WCD, and wherein the base station is configured to respond to the quantity of data in the data buffer meeting the first buffer fullness-threshold by increasing the quantity of carriers on which the base station serves the WCD; and
   while serving the WCD over the radio-link-layer connection, the base station (i) determining a quantity of other devices the WCD is currently providing with connectivity to the base station, (ii) making a determination of whether the quantity of other devices is greater than a predefined threshold, wherein the predefined threshold is greater than zero, and (iii) responsive to the determination being that the quantity of other devices is greater than the predefined threshold, changing the first fullness-threshold to a second fullness-threshold that is lower than the first fullness-threshold, wherein the base station is then configured to respond to the quantity of data in the data buffer meeting the second fullness-threshold by increasing the quantity of channels on which the base station serves the WCD.

6. The method of claim 5, wherein the quantity of carriers is initially just one carrier, and wherein increasing the quantity comprises adding at least one carrier to the radio-link-layer connection to begin providing the WCD with carrier aggregation service.

7. The method of claim 5, further comprising:
   receiving from the WCD data indicating the quantity of other devices the WCD is currently providing with connectivity to the base station; and
   storing the data in a context record for the WCD,
   wherein determining the quantity of other devices the WCD is currently providing with connectivity to the base station comprises referring to the context record for the WCD to determine the quantity of other devices the WCD is currently providing with connectivity to the base station.

8. A base station comprising:

a wireless communication interface for serving a wireless communication device (WCD) over an air interface between the base station and the WCD, wherein the air interface encompasses a quantity of channels on which the base station serves the WCD;

a processing unit;

data storage including a data buffer, wherein the base station is configured to buffer, in the data buffer, data awaiting transmission over the air interface to the WCD, wherein the data buffer has a first fullness-threshold defining a maximum quantity of data that the base station will buffer for the WCD, and wherein the base station is configured to respond to the quantity of data in the data buffer meeting the first fullness-threshold by increasing the quantity of channels on which the base station serves the WCD; and program instructions stored in the data storage and executable by the processing unit to carry out operations comprising:

while the base station is serving the WCD over the air interface, (i) determining a quantity of other devices the WCD is currently providing with connectivity to the base station, (ii) making a determination of whether the quantity of other devices is greater than a predefined threshold, wherein the predefined threshold is greater than zero, and (iii) responsive to the determination being that the quantity of other devices is greater than the predefined threshold, changing the first fullness-threshold to a second fullness-threshold that is lower than the first fullness-threshold, wherein the base station is then configured to respond to the quantity of data in the data buffer meeting the second fullness-threshold by increasing the quantity of channels on which the base station serves the WCD.

9. The base station of claim 8, the operations further comprising:

detecting that the quantity of data in the data buffer meets the second fullness-threshold; and responsive to detecting that the quantity of data in the data buffer meets the second fullness-threshold, increasing the quantity of channels on which the base station serves the WCD.

10. The base station of claim 8, wherein the air interface includes a radio-link-layer connection between the base station and the WCD, wherein the quantity of channels are a quantity of carriers encompassed by the radio-link-layer connection, wherein the radio-link-layer connection initially encompasses just one carrier, and wherein increasing the quantity of channels on which the base station serves the WCD comprises adding at least one carrier to the radio-link-layer connection to begin providing the WCD with carrier aggregation service.

11. The base station of claim 8, the operations further comprising:

receiving from the WCD data indicating the quantity of other devices the WCD is currently providing with connectivity to the base station; and storing the data in a context record for the WCD, wherein the data storage includes the context record, and wherein determining the quantity of other devices the WCD is currently providing with connectivity to the base station comprises referring to the context record for the WCD to determine the quantity of other devices the WCD is currently providing with connectivity to the base station.

* * * * *